Feb. 1, 1949. R. G. PETERSON 2,460,712
COLLAPSIBLE CASKET TABLE FOR AUTOMOBILES
Filed Dec. 21, 1946 2 Sheets-Sheet 1
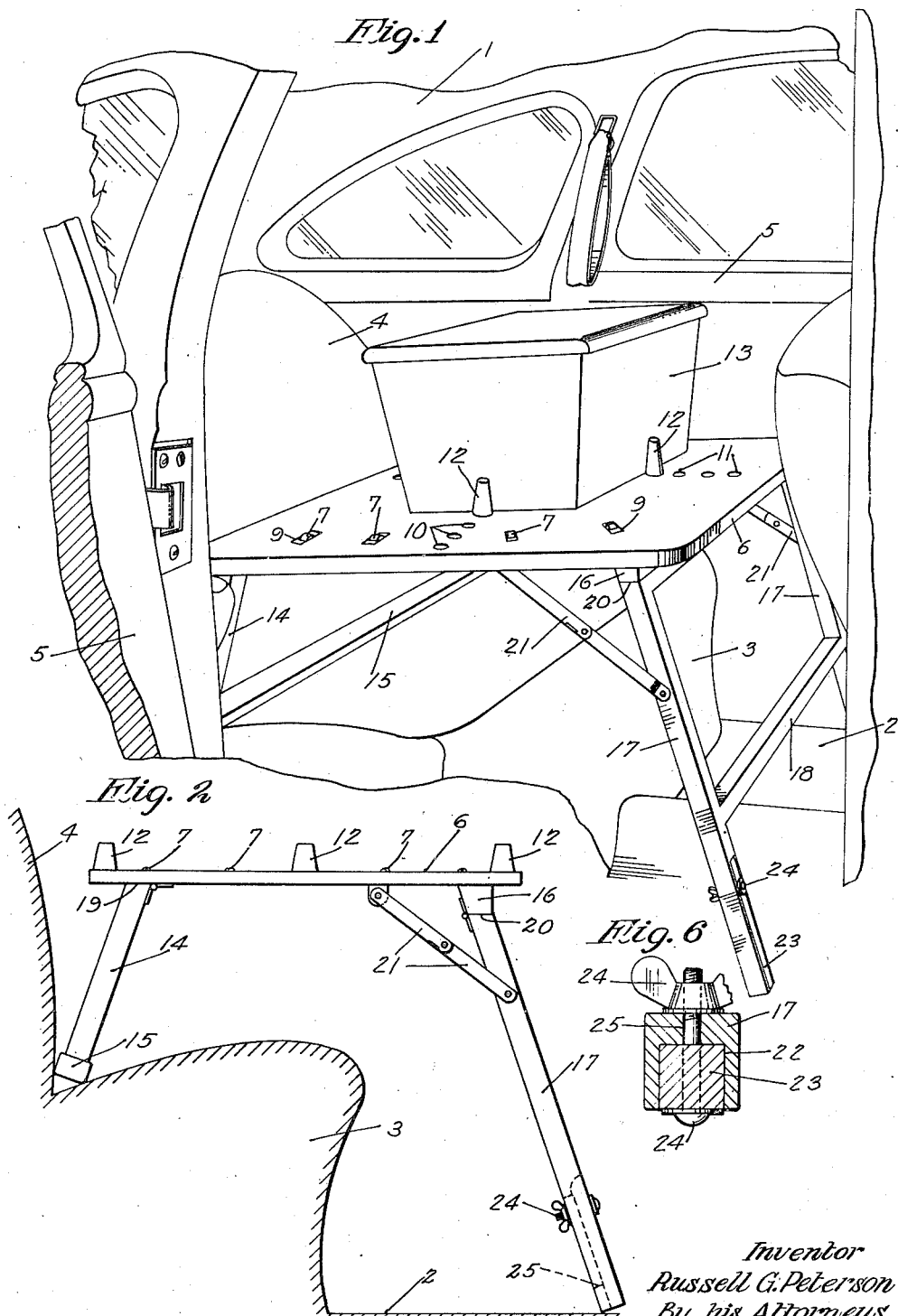
Inventor
Russell G. Peterson
By his Attorneys
Merchant & Merchant Feb. 1, 1949.    R. G. PETERSON    2,460,712
COLLAPSIBLE CASKET TABLE FOR AUTOMOBILES
Filed Dec. 21, 1946    2 Sheets-Sheet 2

Inventor
Russell G. Peterson
By his Attorneys
Merchant & Merchant

Patented Feb. 1, 1949

2,460,712

UNITED STATES PATENT OFFICE 2,460,712

COLLAPSIBLE CASKET TABLE FOR AUTOMOBILES

Russell G. Peterson, Minneapolis, Minn.

Application December 21, 1946, Serial No. 717,753

1 Claim. (Cl. 311—21)

My invention relates to supporting tables for use particularly in a seat-equipped tonneau or body of an automobile.

More particularly, my invention relates to load-carrying tables of the kind immediately above described, which are adapted for use in transporting relatively small caskets in a dignified manner.

An important object of my invention is the provision of a device, which can be used in the rear seat of substantially any modern rear-seat-equipped automobile, and which will carry the casket or other device placed thereon, in a high-off-the-seat level position.

Another object of my invention is the provision of such a device in which the casket or other heavy object may be slidably placed thereon from either side of the automobile and from any angle, depending upon whether the door opens forwardly or rearwardly.

Another object of my invention is the provision of such a device, which is light in weight, which can be readily installed in an automobile by a single operator, and which can be compactly folded for storage, transportation, or shipping.

Another object of my invention is the provision of a casket-supporting table having a relatively long pair of legs for engagement with the floor of the vehicle, a relatively short pair of legs for engagement with the seat of the automobile, and means on one pair of said legs for adjustably extending them, in order to maintain a level position of the supporting top in all types of vehicles and irrespective of the relative height of the seat with respect to the floor.

A still further object of my invention is the provision of means carried by the relatively short legs to prevent the same from slipping down between the seat and the back thereof and for preventing possible damage to the upholstered seat.

The above and still further objects of my novel invention will become apparent from the following detailed specification, appended claim, and attached drawings.

Referring to the drawings wherein like characters indicate like parts throughout the several views:

Fig. 1 is a fragmentary perspective view of an automobile, showing my device applied to the rear seat compartment thereof;

Fig. 2 is a side elevation of my device, some parts of the automobile being shown in section;

Fig. 6 is an enlarged sectional view taken on the line 6—6 of Fig. 1.

Figure 3:
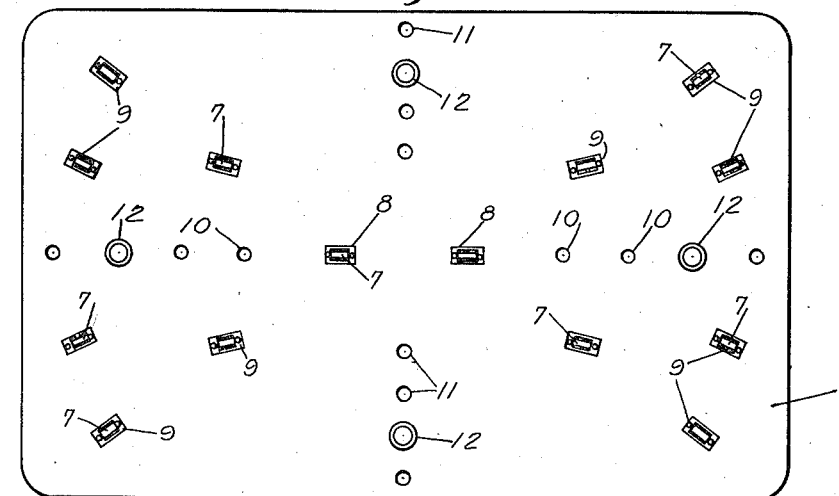
Fig. 3 is a plan view of my supporting table.

Referring with greater particularity to the drawings, the numeral 1 indicates, in its entirety, an automobile body or tonneau having a floor 2; a rear seat 3 provided with a back 4, and rear doors 5.

My novel device comprises an elongated rectangular casket-supporting top 6, preferably and as shown, provided with a plurality of pairs of upstanding rollers 7, the peripheral surface of which extend above the plane of the upper surface of the top 6. For a purpose which will hereinafter become apparent, I preferably arrange the rollers 7 so that those adjacent the center are parallel to the longitudinal axis of the top 6, as indicated at 8, and so that others are disposed at several angles to the longitudinal axis of the top 6, as indicated at 9. As shown, all these rollers radiate from the approximate center of the top 6 to facilitate slidably placing a casket thereon from either end and from any angle of approach at either end.

Figure 4:
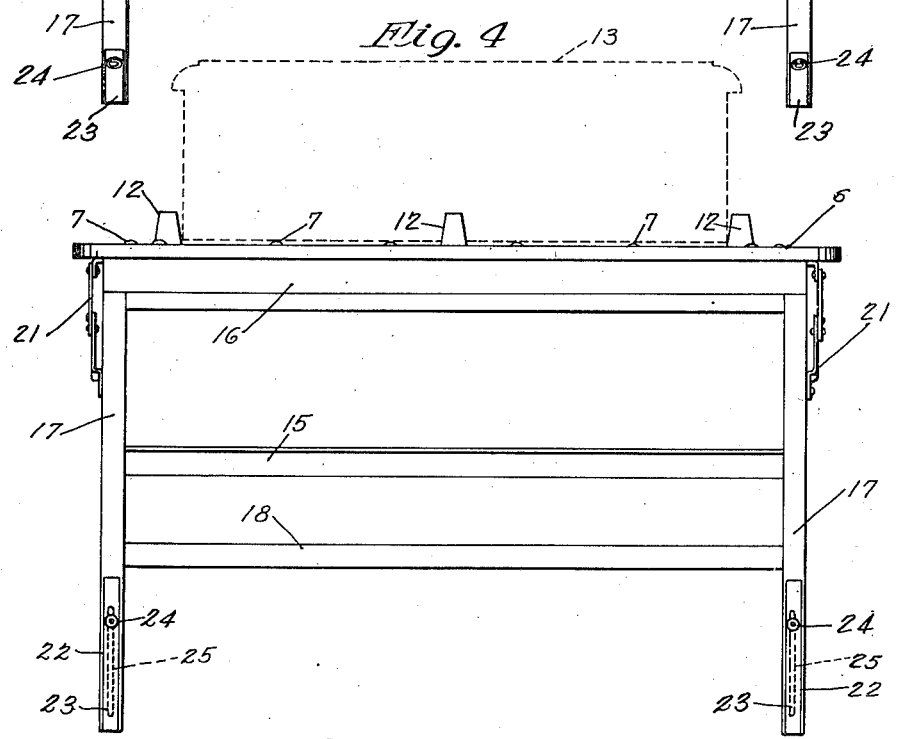
Fig. 4 is a front elevation of the parts shown in Fig. 3 and illustrating, by dotted lines, a casket supported thereon.

Top 6 is also provided with a plurality of longitudinally-spaced openings 10 and a plurality of laterally-spaced openings 11, into which openings are adapted to fit a plurality of pegs 12, which, as shown in Figs. 1 and 4, prevent longitudinal and lateral shifting movements of a casket or the like 13 placed on the table top 6, during transportation. Hingedly secured in spaced relationship to the under surface of top 6, adjacent one longitudinal edge thereof, is a pair of relatively short legs 14, which are secured together at their bases by an enlarged foot-forming brace member 15. Hingedly secured to a longitudinally-extended depending bar 16, adjacent the opposite longitudinal edge of top 6, is a pair of relatively long legs 17, which are connected by a longitudinal brace member 18 at their intermediate portions.

Figure 5:
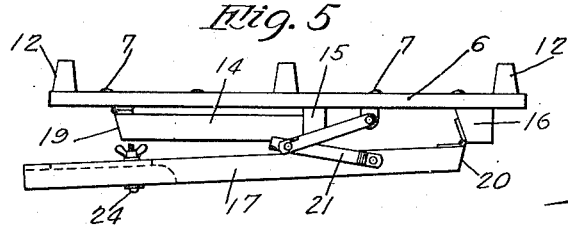
Fig. 5 is an end elevation of my device in a folded position.

As shown, the relatively long legs 17 are adapted to engage the floor 2 of the vehicle, whereas the relatively short legs 14 are adapted to engage the seat 3 of the vehicle. Both pairs of legs 14 and 17 are adapted to be folded against the under surface of the top 6, as shown in Fig. 5, and are adapted to be moved pivotally to a downwardly and outwardly extended supporting position, as indicated in Figs. 1 and 2. The relatively short legs 14 are limited in their downward and outward swinging movements by engagement of the lower surface of the top 6 with the beveled end portion 19 of the leg 14; whereas the relatively long legs 17 are limited in their downward and outward swinging movements by engagement of the lower surface of bar 16 with the beveled ends 20 of the legs 17. It is desirable to lock at least one of the pairs of legs against accidental folding movements; and for this purpose, I preferably provide a pair of toggle acting levers 21, which are diagonally disposed between the relatively long legs 17 and the table top 6. This toggle-acting brace structure and the means of connecting the same to the table are in general use in folding card tables and the like, and, hence, will not be explained in detail.

In order to maintain the table top 6 in a horizontal load-supporting position within various tonneau designs, wherein the height of the seat 3 with respect to the floor 2 may vary considerably, I have found it desirable to make one of the pairs of legs longitudinally, adjustably extensible. As shown, each of the relatively long legs 17 adjacent their lower ends, is grooved, as indicated at 22, to slidably receive a leg-extending element 23. Element 23 is frictionally retained within the groove 22, at the desired position, by means of a wing nut-equipped bolt 24, which extends therethrough and through a slot 25 in each of the legs 17.

As shown in Fig. 5, my novel structure may be folded relatively flat for the purpose of storage, shipment, or the like. When it is desired to place the same in the rear seat compartment of a closed automobile or the like, the job may be accomplished by a single operator. The width of the top 6 may, in many instances, be greater than the width of the rear door opening. However, this width is never greater than the height of the door opening; therefore, it is desirable to place the device in the compartment initially in a folded condition with the top 6 vertically disposed. Thereafter, the pairs of legs 14 and 17 may be readily swung to the load-supporting position, as indicated in Figs. 1 and 2. As shown in Fig. 2, it is usually desirable that the bottom ends of legs 14 be positioned adjacent the juncture of the seat 3 with the back 4 thereof. However, to prevent the legs 14 from unduly depressing the upholstered seat 3 or from forcing their weight downwardly between the element 3 and 4, the foot-forming brace member is provided.

My device has been thoroughly tested and found to supply a completely unfilled want.

While I have described a commercial embodiment of my invention as provided by section 4888 of the United States Statutes, it should be obvious that the same is capable of modification without departure from the scope of the appended claim.

What I claim is:

In a device of the class described, a casket-receiving top, a pair of relatively long supporting legs hingedly secured to the lower surface of said top adjacent one longitudinal edge thereof and adapted to engage the floor of a vehicle adjacent an upstanding seat, said legs being longitudinally extensible and contractible, and a pair of relatively short legs hingedly secured to the lower surface of said top adjacent the opposite longitudinal edge thereof and adapted to rest upon said seat, said shorter legs being connected at their bases by an enlarged seat-engaging brace member.

RUSSELL G. PETERSON.

REFERENCES CITED

The following references are of record in the file of this patent:

UNITED STATES PATENTS

| Number | Name | Date |
|---|---|---|
| 732,585 | Reinhart | June 30, 1903 |
| 1,576,455 | Parker | Mar. 9, 1926 |
| 1,599,247 | Ridabock | Sept. 7, 1926 |
| 1,924,945 | Klotz | Apr. 29, 1933 |
| 1,928,217 | Bruning | Sept. 26, 1933 |
| 2,088,093 | Richter | July 27, 1937 |
| 2,106,834 | Ewald | Feb. 1, 1938 |
| 2,143,285 | Schofield | Jan. 10, 1939 |
| 2,337,505 | Swift | Dec. 21, 1943 |
| 2,400,312 | Miller | May 14, 1946 |

FOREIGN PATENTS

| Number | Country | Date |
|---|---|---|
| 260,709 | Great Britain | Nov. 11, 1926 |